United States Patent
Kim et al.

(10) Patent No.: US 11,247,171 B2
(45) Date of Patent: Feb. 15, 2022

(54) METAL CATALYST SUPPORT, MANUFACTURING METHOD AND APPARATUS THEREFOR

(71) Applicant: AMOGREENTECH CO., LTD., Gimpo-si (KR)

(72) Inventors: Myoung Soo Kim, Seoul (KR); Tong Bok Kim, Gimpo-si (KR)

(73) Assignee: AMOGREENTECH CO., LTD., Gimpo-si (KR)

(*) Notice: Subject to any disclaimer, the term of this patent is extended or adjusted under 35 U.S.C. 154(b) by 134 days.

(21) Appl. No.: 16/846,880

(22) Filed: Apr. 13, 2020

(65) Prior Publication Data
US 2020/0238215 A1 Jul. 30, 2020

Related U.S. Application Data

(62) Division of application No. 16/341,659, filed as application No. PCT/KR2017/011342 on Oct. 13, 2017, now Pat. No. 10,646,825.

(30) Foreign Application Priority Data

Oct. 20, 2016 (KR) .................. 10-2016-0136544
Oct. 20, 2016 (KR) .................. 10-2016-0136546

(51) Int. Cl.
  *B23B 3/28* (2006.01)
  *B01D 53/88* (2006.01)
  (Continued)

(52) U.S. Cl.
  CPC ............ *B01D 53/885* (2013.01); *B01J 35/02* (2013.01); *B21D 13/04* (2013.01); *B21D 43/02* (2013.01);
  (Continued)

(58) Field of Classification Search
  CPC ......... B21D 43/02; B32B 15/01; B32B 37/18; B32B 2250/42; B32B 38/1808
  (Continued)

(56) References Cited

U.S. PATENT DOCUMENTS 4,845,073 A  7/1989 Cyron
5,395,599 A  3/1995 Koshiba et al.
(Continued)

FOREIGN PATENT DOCUMENTS

JP   01280613   11/1989
JP   05285398   11/1993
(Continued)

OTHER PUBLICATIONS

International Search Report—PCT/KR2017/011342 dated Jan. 15, 2018.

*Primary Examiner* — Tom P Duong
(74) *Attorney, Agent, or Firm* — Cantor Colburn LLP

(57) ABSTRACT

Provided is a method of manufacturing a metal catalyst support including: transferring a plate member of the same size along a transfer unit; aligning the plate member so that a front portion of the plate member is located at a start point when the plate member reaches a set position; forming a corrugated plate by alternately forming a first corrugated portion and a second corrugated portion on the plate member which is aligned at the start point; and laminating the fabricated corrugated plates and the flat plates alternately in a case.

3 Claims, 4 Drawing Sheets

(51) Int. Cl.
*B01J 35/02* (2006.01)
*B21D 13/04* (2006.01)
*B21D 43/02* (2006.01)
*B32B 3/28* (2006.01)
*B32B 15/01* (2006.01)
*B32B 37/18* (2006.01)
*B32B 38/18* (2006.01)

(52) U.S. Cl.
CPC ............ *B32B 3/28* (2013.01); *B32B 15/01* (2013.01); *B32B 37/18* (2013.01); *B32B 38/1808* (2013.01); *B01D 2257/302* (2013.01); *B01D 2257/404* (2013.01); *B01D 2257/502* (2013.01); *B01D 2257/702* (2013.01); *B32B 2250/42* (2013.01); *B32B 2255/06* (2013.01); *B32B 2307/724* (2013.01); *B32B 2311/00* (2013.01)

(58) Field of Classification Search
USPC ..................................................... 290/890
See application file for complete search history.

(56) References Cited

U.S. PATENT DOCUMENTS

| | | | |
|---|---|---|---|
| 5,460,790 | A | 10/1995 | Shustorovich et al. |
| 6,057,263 | A | 5/2000 | Takahashi et al. |
| 6,187,274 | B1 | 2/2001 | Nilsson |
| 6,287,523 | B1 | 9/2001 | Hirobashi et al. |
| 6,602,477 | B2 | 8/2003 | Sakamoto et al. |
| 8,336,176 | B2 | 12/2012 | Hodgson et al. |
| 9,091,196 | B2 | 7/2015 | Maus et al. |
| 2006/0168810 | A1* | 8/2006 | Haesemann .......... B21D 35/00 29/890 |

FOREIGN PATENT DOCUMENTS

| | | |
|---|---|---|
| JP | 07108176 | 4/1995 |
| JP | 10249213 | 9/1998 |
| JP | 2001096171 | 4/2001 |
| KR | 20020048895 | 6/2002 |
| KR | 20120117426 | 10/2012 |
| KR | 20160097649 | 8/2016 |

\* cited by examiner

METAL CATALYST SUPPORT, MANUFACTURING METHOD AND APPARATUS THEREFOR

TECHNICAL FIELD

The present disclosure relates to a metal catalyst support in which vertexes of corrugated plates to be laminated with each other coincide with each other, a manufacturing method thereof, and an apparatus for manufacturing the same.

BACKGROUND ART

Pollutants such as nitrogen oxides, sulfur oxides, carbon monoxide, and hydrocarbons contained in exhaust gas are a great threat to the human environment. Countries are also strengthening regulations on harmful exhaust gas or accelerating the development of technologies for reducing harmful emissions.

Automobiles with the largest emissions have a direct impact on the on-the-ground environment in which humans live. As a result, regulatory demands have been high and treatment technologies have been advancing early. However, regulation of exhaust gas of ships has been relatively recently started and International Maritime Organization (IMO) and advanced countries are actively preparing countermeasures.

In the field of NOx reduction among green ship exhaust gas treatment technologies to respond to environmental regulations related to shipbuilding and shipping industry of IMO, a selective catalytic reduction (SCR) system with proven performance, safety and economic efficiency is getting popular.

The SCR system includes a reactor equipped with a honeycomb structure catalyst support. The catalyst support induces the exhaust gas mixed with NOx and ammonia ($NH_3$) to generate nitrogen and water through a reduction reaction. As a material of the catalyst support, a ceramic extruded material which is easy to be mass-produced at low cost has been devised, but the use of a metal support which can be manufactured with a thin thickness and has excellent mechanical properties is also increasing.

Korean Patent Application Publication No. 10-2012-0117426 discloses a structure in which a large-capacity catalyst support is manufactured in the form of a unit catalyst support block and then assembled, but has a complicated structure having a lot of fastening points in which an assembly member is an element center for being engaged between adjacent unit catalyst support blocks.

In addition, the unit catalyst support block includes a support for accommodating and inserting cell forming bodies as a polygonal structure in which each of the cell forming bodies having a plurality of hollow cells corresponds to the shape of the cell forming bodies by a wave plate/flat plate assembly fabricated from a wave plate and a flat plate made of a thin metal plate coated with a catalyst on the surface thereof.

Furthermore, conventional metal supports implemented by using the wave plate/flat plate assembly fabricated from a wave plate and a flat plate made of a thin metal plate coated with a catalyst on the surface thereof use an integrated wave plate/flat plate assembly fabricated by using a joining method such as brazing, welding, soldering, and diffusion bonding, thereby causing low productivity and making it difficult to secure price competitiveness.

In addition, when the wave plates and the flat plates are alternately stacked, the vertexes of the wave plates do not coincide with each other, so that the wave plates and the flat plates may be deformed due to external vibration, shock, or temperature change.

DISCLOSURE

Technical Problem

Accordingly, it is an object of the present disclosure to provide a metal catalyst support capable of minimizing deformation during thermal expansion due to external impact, vibration, and temperature change by making vertexes of laminated corrugated plates face and coincide with each other.

Another object of the present disclosure is to provide a metal catalyst support capable of forming convex portions and concave portions at vertexes of corrugated plates, respectively and forming concavo-convex portions in the flat plates so that the convex portions and the concave portions can be inserted into the concavo-convex portions, and thus the corrugated plates and the flat plate can be fixed without any separate bonding.

Another object of the present disclosure is to provide a method of manufacturing a metal catalyst support capable of shortening a manufacturing process by eliminating the need for a separate cutting step for matching the shapes of the corrugated plates by making the corrugated plates in the same shape in the manufacturing process for producing the corrugated plates and a manufacturing apparatus thereof.

Technical Solution

According to an aspect of the present disclosure, there is provided a metal catalyst support including: a case having a space through which exhaust gas passes; and flat plates and corrugated plates which are alternately stacked in the case and coated with a catalyst, wherein the corrugated plates are formed such that a first corrugated plate and a second corrugated plate are disposed with the flat plate therebetween, the first corrugated plate and the second corrugated plate are disposed such that a first corrugated portion and a second corrugated portion are alternately and repeatedly formed, and the vertex of the first corrugated portion and the vertex of the second corrugated portion face and coincide with each other.

A convex portion is formed at a vertex of the first corrugated portion, a concave portion is formed at a vertex of the second corrugated portion, and a concavo-convex portion is formed on the flat plate, so that the convex portion is inserted into the convexo-concave portion, and the convexo-concave portion is inserted into the concave portion.

According to another aspect of the present disclosure, there is provided a metal catalyst support manufacturing apparatus including: a transfer unit for transferring a plurality of plate members having the same size at regular intervals; a first shaping roller and a second shaping roller which are rotatably engaged with each other such that first and second corrugated portions are repeatedly formed in plate members which are transferred by the transfer unit; and a position aligning unit for equally shaping the shapes of all the plate members by matching start points where the plate members are engaged with the first shaping roller and the second shaping roller.

The transfer unit may be a belt conveyor on which the plate members are conveyed in a state in which the plate members are seated.

The position aligning unit includes: a feed unit for feeding the plate member to the start point P of the first shaping roller and the second shaping roller; a position detection sensor for detecting the position of the plate member when the plate member is positioned at the start point, and a control unit for controlling operation of the input unit according to a signal applied from the position detection sensor.

The feed unit can use any one method of a method of allowing the control unit to control the transfer unit to feed the plate member to the start point and a method of transferring the plate member to the start point by installing a separate feed unit on one side of the transfer unit.

According to another aspect of the present disclosure, there is provided a method of manufacturing a metal catalyst support, the method including: transferring a plate member of the same size along a transfer unit; aligning the plate member so that a front portion of the plate member is located at a start point when the plate member reaches a set position; forming a corrugated plate by alternately forming a first corrugated portion and a second corrugated portion on the plate member which is aligned at the start point; and laminating the fabricated corrugated plates and the flat plates alternately in a case.

The corrugated plate may be arranged so that the vertex of the first corrugated portion and the vertex of the second corrugated portion face and coincide with each other.

The aligning the plate member to the start point includes: transferring the plate member to a start point by operating the feed unit when the plate member is moved along the transfer unit and arrives at the set position; allowing a position detection sensor to detect the position of the plate member when the plate member is positioned at the start point to thereby applying a detection signal to a control unit; and allowing the control unit to stop the operation of the feed unit so that the plate member is aligned at the start point.

Advantageous Effects

As described above, according to the present disclosure, deformation during thermal expansion due to external impact, vibration, and temperature change can be minimized by making vertexes of laminated corrugated plates face and coincide with each other.

In addition, convex portions and concave portions are formed at vertexes of corrugated plates, respectively and concavo-convex portions are formed in the flat plates so that the convex portions and the concave portions can be inserted into the concavo-convex portions, and thus the corrugated plates and the flat plate can be fixed without any separate bonding.

In addition, since the shapes of the corrugated plates are made the same in the manufacturing process for producing the corrugated plates, a separate cutting step for matching the shapes of the corrugated plates is unnecessary, and thus the manufacturing process can be shortened.

BEST MODE

Figure 1:
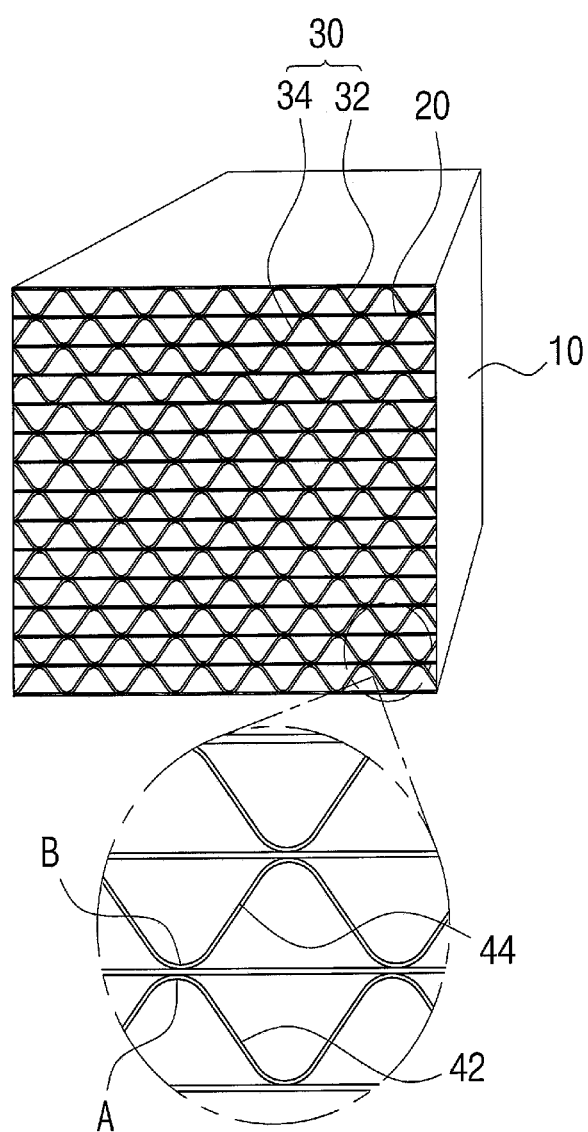
FIG. 1 is a front view of a metal catalyst support according to a first embodiment of the present disclosure.

Hereinafter, embodiments of the present invention will be described in detail with reference to the accompanying drawings. The sizes and shapes of the components shown in the drawings may be exaggerated for clarity and convenience. In addition, terms defined in consideration of the configuration and operation of the present invention may vary depending on the intention or custom of the user, the operator, and the like. Definitions of these terms should be based on the content of this specification.

Referring to FIG. 1, a metal catalyst support according to a first embodiment of the present invention includes: a case 10 of which both sides are opened; and flat plates 20 and corrugated plates 30 which are alternately stacked in the case 10.

The metal catalyst support is installed in an engine or furnace of a ship, a power plant or a large plant such as an incinerator, and is configured to generate nitrogen and water through reduction reaction of exhaust gas mixed with nitrogen oxide (NOx) and ammonia ($NH_3$).

The catalyst support is disposed between the exhaust pipes, and a large-capacity catalyst support for supporting the catalyst therein may be disposed in a multi-stage or single-stage configuration.

The case 10 has a square shape with both open ends, and both ends thereof are connected to an exhaust pipe. The flat plates 20 and the corrugated plates 30 are formed of a heat-resistant thin metal plate, and have the thickness of preferably 20 μm to 100 μm.

The corrugated plates 30 are formed in a wavy shape or a concavo-convex shape, and the flat plates 20 are formed in a flat plate shape. When the corrugated plates 30 and the flat plates 20 are alternately stacked in the case 10, passages through which the exhaust gas passes are formed. The surfaces of the flat plates 20 and the corrugated plates 30 are coated with a catalyst material which reacts with the exhaust gas to purify the exhaust gas.

The corrugated plate 30 is configured so that a first corrugated plate 32 and a second corrugated plate 34 are laminated alternately with the flat plate 20 interposed therebetween. A first corrugated portion 42 protruding upwardly and convexly and a second corrugated portion 44 protruding downwardly and convexly are repeatedly formed in a wave pattern on the first corrugated plate 32 and the second corrugated plate 34.

The vertex A of the first corrugated portion 42 of the first corrugated plate 32 is aligned with the vertex B of the second corrugated portion 44 of the second corrugated plate 34 so as to face each other. That is, the vertex A of the first waveform portion 42 and the vertex B of the second waveform portion 44 are assembled facing each other with the flat plate 20 interposed therebetween.

As described above, since the vertexes of the corrugated plates 30 are assembled to coincide with each other, the supporting force between the corrugated plates 30 is improved, so that deformation of the corrugated plates 30 and the flat plates 20 due to external impact or vibration, and the pressure through which the exhaust gas passes, and the thermal expansion due to the temperature change can be minimized.

Figure 2:
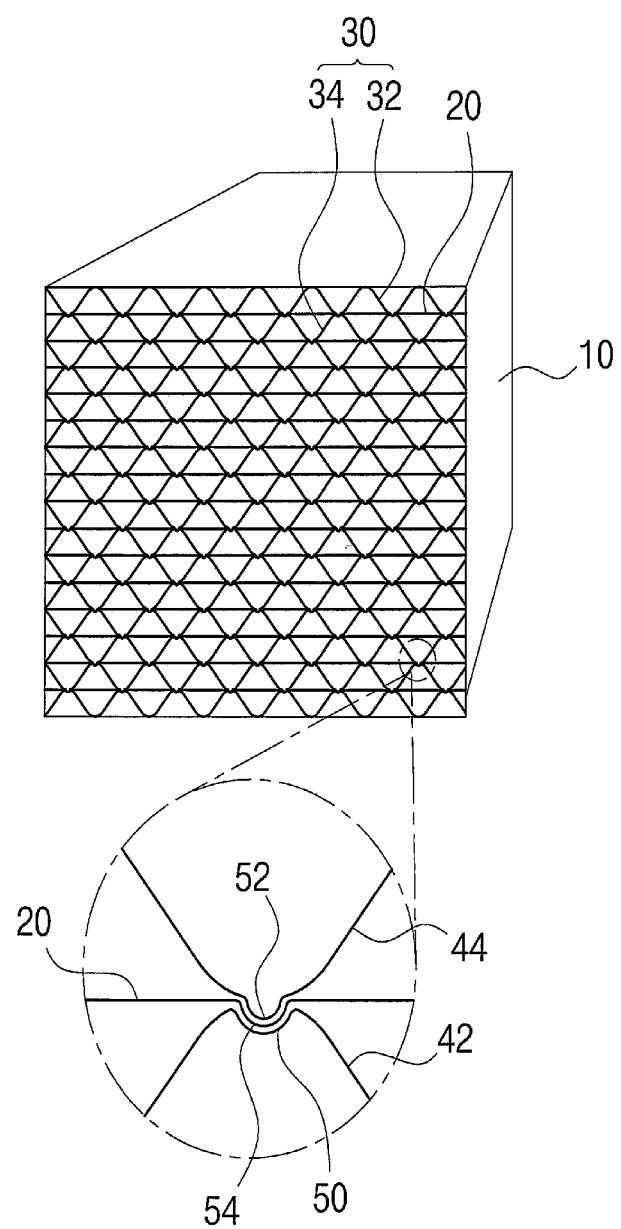
FIG. 2 is a front view of a metal catalyst support according to a second embodiment of the present disclosure.

As shown in FIG. 2, the metal catalyst support according to the second embodiment has a concave portion 50 formed in the longitudinal direction at the vertex of the first corrugated portion 42 of the corrugated plate 30, a convex portion 52 formed in the longitudinal direction at the vertex of the concave portion 44, and a concavo-convex portion 54 formed in the flat plate 20 at a position where the convex portion 52 and the concave portion 50 meet.

Therefore, when the first corrugated plates 32, the flat plates 20 and the second corrugated plates 34 are alternately stacked, the concave-convex portion 54 of the flat plate 20 is inserted into the concave portion 50 of the first corrugated plate 32, and the convex portion 52 of the second corrugated plate 44 is inserted into the concave-convex portion 54 of the flat plate 20. Thus, the first corrugated plate 32, the flat plate 20, and the second corrugated plates 34 are mutually engaged with each other, so that the corrugated plate and the flat plate can be fixed without separate joining.

In order to assemble the corrugated plates so that the vertexes of the corrugated plates coincide with each other like the metal catalyst support according to the first embodiment, all corrugated plates should be formed in the same shape. That is, the start positions where the corrugated portions of both edges of the corrugated plate are formed should be formed identically, so that the vertexes of the corrugated plates can be matched when assembling the corrugated plates.

In order to form the start positions of the edges of the corrugated plates identically, as described above, the cutting process should be performed after having matched the start points of the edges of the manufactured corrugated plates in a separate step.

In this case, a separate step of cutting the edges of the corrugated plates in order to match the edges of the corrugated plates is required, which may cause an additional manufacturing process.

The apparatus for manufacturing a metal catalyst support according to an embodiment of the present invention is manufactured such that the start points of the corrugation plates are matched each other in the process of manufacturing the corrugated plates, so that a separate process for cutting and matching the edges of the corrugated plates is unnecessary.

Figure 3:
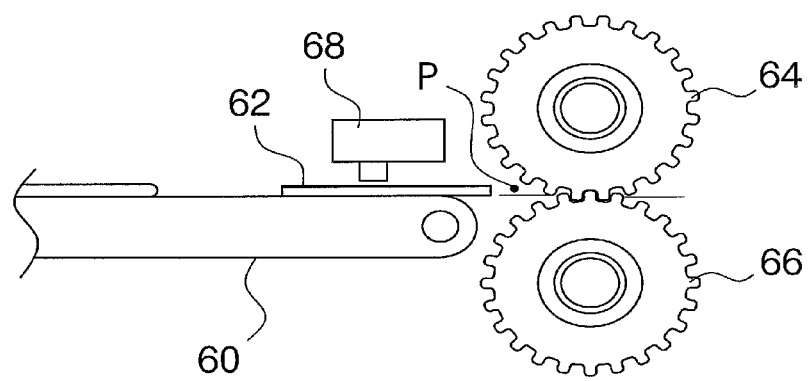
FIG. 3 is a configuration diagram of an apparatus for manufacturing a metal catalyst support according to the present disclosure.

As shown in FIG. 3, the apparatus for producing a catalyst support according to an embodiment of the present invention includes: a transfer unit 60 for sequentially transferring a plurality of plate members 62 having the same size and a flat plate shape; shaping rollers 64 and 66 which are configured to form a corrugated wave form in a corrugated shape such that first and second corrugated portions 42 and 44 are alternately formed in plate members 62 which are transferred by the transfer unit 60; and a position aligning unit 68 disposed in front of the shaping rollers 64 and 66 and for matching the start points P of the plate members 62 which are drawn into the shaping rollers 64 and 66.

The transfer unit 60 is a belt conveyor, and transfers a plurality of plate members 62 which are arranged in a row to then be sequentially supplied to the shaping rollers 64 and 66.

The shaping rollers 64 and 66 include a first shaping roller 64 having gear teeth formed on its outer surface and a second shaping roller 66 having the same shape as the first shaping roller and rotatably engaged with the first shaping roller 64. When the plate member 62 passes between the first shaping roller 64 and the second shaping roller 66, the first corrugated portion 42 and the second corrugated portion 44 are repeatedly formed on the plate member 62.

Figure 4:
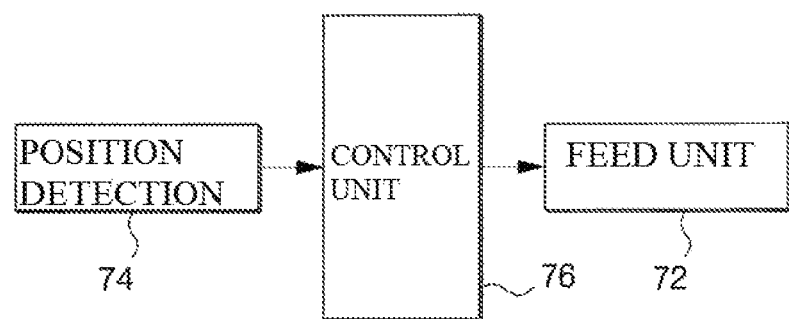
FIG. 4 is a block diagram showing an input unit according to the present disclosure.

As shown in FIG. 4, the position aligning unit 68 is configured to match a start point P at which the plate member 62 is held by the first shaping roller 64 and the second shaping roller 66 and an end point at which the plate member 62 passes through the first shaping roller 64 and the second shaping roller 66 and is discharged so that the shapes of all the corrugated plates 30 are formed to be the same.

As shown in FIG. 4, the position aligning unit 68 includes: a feed unit 72 which feeds the plate member 62 transferred by the transfer unit 60 to the start point P of the first shaping roller 64 and the second shaping roller 66; a position detection sensor 74 for detecting the position of the plate member 62 when the plate member 62 is positioned at the start point at which the plate member 62 is held by the first shaping roller 64 and the second shaping roller 66; and a control unit 76 for controlling the operation of the feed unit 72 in accordance with a signal applied from the position detection sensor 74.

The position detection sensor 74 is disposed at the start point P to detect the front surface of the plate member 62 or is disposed at the transfer unit 60 to detect the rear surface of the plate member 62 when the front end of the plate member 62 is positioned at the start point.

The feed unit 72 may employ any method of feeding the plate member 62 into the start position. For example, when the transfer unit 60 simultaneously serves as a feed unit and the plate member 62 reaches the start point, the type in which the operation of the transfer unit 60 is stopped can be applied, and the step motor type or cylinder type of directly transferring the plate member 62 can be applied.

Here, the start point P is a point at which the plate member 62 is held between the first shaping roller 64 and the second shaping roller 66 when the first shaping roller 64 and the second shaping roller 66 are rotatably engaged with each other, and the position at which the plate member 62 is held between the first shaping roller 64 and the second shaping roller 66 is always matched when the plate member 62 is located at the start point P. Therefore, the corrugated plates 30 having the same shape can be continuously produced.

A method for manufacturing a metal catalyst support using the apparatus for manufacturing a metal catalyst support structured as described above will be described below.

The method of manufacturing the metal catalyst support as constructed above will be described below.

Figure 5:
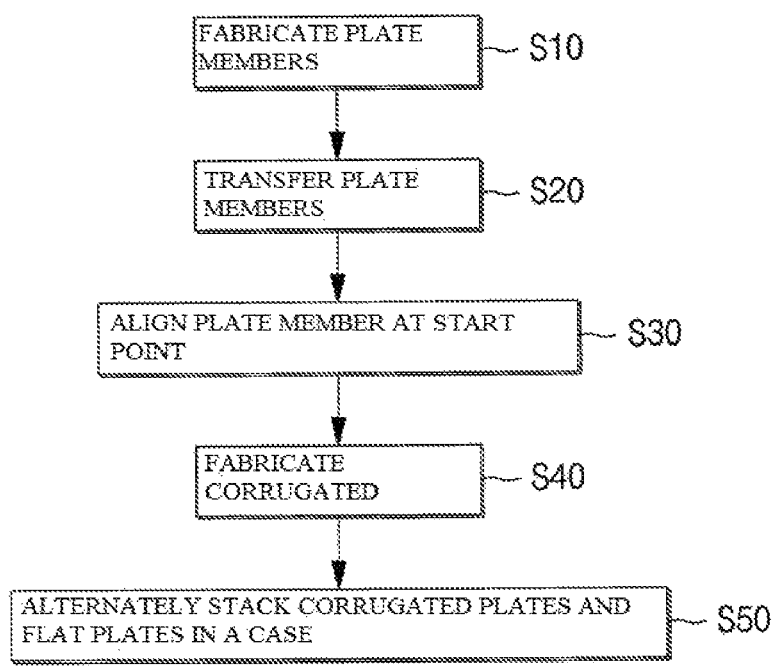
FIG. 5 is a flowchart showing a process for producing a metal catalyst support according to the present disclosure.

FIG. 5 is a flowchart showing a process for producing a metal catalyst support according to an embodiment of the present invention.

First, the flat plate-like plate member 62 is cut into the same size (S10). Then, when the plate member 62 is aligned with the transfer unit 60 at regular intervals and the transfer unit 60 is operated, the plate member 62 is transferred by the transfer unit 60 (S20).

When the plate member 62 is moved along the feed unit 60 and reaches a set point in front of the first shaping roller 64 and the second shaping roller 66, the front end of the plate member 62 is aligned at the start point (P) by the position aligning unit 68. When the front end of the plate member 62 positioned at the start point P is held to the first shaping roller 64 and the second shaping roller 66 and the plate member 62 passes through the first shaping roller 64 and the second shaping roller 66, corrugated plates 30 are manufactured in which the first corrugated portions 42 and the second corrugated portions 44 are alternately formed.

Here, when the plate member 62 is positioned at the start point P, the position of the plate member 62 that is held by the first shaping roller 64 and the second shaping roller 66 is always constant, and thus the produced corrugated plates 30 can be formed in the same shape.

Therefore, a separate cutting process for manufacturing the shapes of the corrugated plates 30 identically is unnecessary, and thus the manufacturing process can be shortened.

The operation and function of the position aligning unit 68 will be described below. When the plate member 62 is transferred along the transfer unit 60 and arrives at a set position, the feed unit 72 is operated to feed the plate member 62 to the start point P. When the plate member 62 is positioned at the start point P, the position detection sensor 74 senses whether the plate member 62 is positioned at the start point P and applies the position detection result signal to the control unit 76. The control unit 76 controls the operation of the feed unit 72 to be stopped, so that the plate member 62 can be aligned at the start point P.

After the fabrication of the corrugated plates 30 is completed by such a process, the first corrugated plates 32, the flat plates 20, and the second corrugated plates 34 are alternately stacked in the case 10, to thus complete the manufacturing of the metal catalyst support. Here, the first corrugated plate 32 and the second corrugated plate 34 have the same shape, and the second corrugated plate 34 is in a state in which the first corrugated plate 32 is turned upside down.

Since the corrugated plates 30 are all formed in the same shape, and when the corrugated plates 30 are stacked inside the case 10 in the form of a rectangular barrel, the vertexes of the first corrugated portions 42 of the first corrugated plates 32 and the vertexes of the second corrugated portions 44 of the second corrugated plates 34 are aligned to face each other.

INDUSTRIAL APPLICABILITY

The present invention relates to a metal catalyst support for removing pollutants such as nitrogen oxides, sulfur oxides, carbon monoxide and hydrocarbons contained in exhaust gas generated from engines in automobiles and ships. By matching the vertexes between the corrugated plates to face each other, it is possible to extend the service life by minimizing deformation during external impact or thermal expansion due to temperature change.

What is claimed is:

1. A method of manufacturing a metal catalyst support, the method comprising: transferring a plate member of a same size along a transfer unit;

aligning the plate member so that a front portion of the plate member is located at a start point when the plate member reaches a set position;

forming a corrugated plate by alternately forming a first corrugated portion and a second corrugated portion on the plate member which is aligned at the start point; and laminating the corrugated plate and a flat plate alternately in a case, wherein the aligning the plate member comprises:

transferring the plate member to the start point by operating a feed unit when the plate member is moved along the transfer unit and arrives at the set position;

allowing a position detection sensor to detect a position of the plate member when the plate member is positioned at the start point to thereby applying a detection signal to a control unit; and allowing the control unit to stop the operation of the feed unit so that the plate member is aligned at the start point.

2. The method of claim 1, wherein the corrugated plate is arranged so that the vertex of the first corrugated portion and the vertex of the second corrugated portion face and coincide with each other.

3. The method of claim 1, wherein the forming the corrugated plate is performed to form the corrugated plate by passing the plate member between a first shaping roller and a second shaping roller which are rotatably engaged with each other.

* * * * *